(12) United States Patent
Demskie

(10) Patent No.: US 10,075,665 B2
(45) Date of Patent: *Sep. 11, 2018

(54) COMPANION CONTROL INTERFACE FOR SMART DEVICES

(71) Applicant: Remote Technologies Incorporated, Shakopee, MN (US)

(72) Inventor: John Michael Demskie, Prior Lake, MN (US)

(73) Assignee: Remote Technologies, Inc., Shakopee, MN (US)

( * ) Notice: Subject to any disclaimer, the term of this patent is extended or adjusted under 35 U.S.C. 154(b) by 147 days.

This patent is subject to a terminal disclaimer.

(21) Appl. No.: 14/550,553

(22) Filed: Nov. 21, 2014

(65) Prior Publication Data

US 2016/0124402 A1    May 5, 2016

Related U.S. Application Data

(63) Continuation of application No. 13/115,363, filed on May 25, 2011, now Pat. No. 8,897,897.

(51) Int. Cl.
*H04N 5/44* (2011.01)
*H04N 21/00* (2011.01)
(Continued)

(52) U.S. Cl.
CPC ........... *H04N 5/4403* (2013.01); *G05B 15/02* (2013.01); *G08C 17/02* (2013.01); *G08C 23/04* (2013.01);
(Continued)

(58) Field of Classification Search
CPC ............ G08C 2201/20; G08C 2201/21; G08C 2201/30; G08C 2201/42; G08C 2201/70;
(Continued)

(56) References Cited

U.S. PATENT DOCUMENTS 6,407,779 B1    6/2002 Herz
6,553,345 B1    4/2003 Kuhn et al.
(Continued)

FOREIGN PATENT DOCUMENTS

KR    1020110134603 A    12/2011

*Primary Examiner* — Crystal J Barnes-Bullock
(74) *Attorney, Agent, or Firm* — Craig J. Lervick; Larkin Hoffman Daly & Lindgren, Ltd.

(57) ABSTRACT

A companion remote control system is usable with smart devices for controlling a plurality of controlled components. An overall control system includes: a companion remote configured for remote communication, and providing command options for a user desiring to interact with a controlled component; a software application configured for running on smart devices, which typically includes a graphical interface for the user to select desired controlled component from plurality of controlled components; and a control processor capable of communicating with companion remote, smart device and controlled components. The control processor is programmed to correlate user commands received from companion remote to appropriate instructions for a specific controlled component selection received from smart device. The control processor instructing the controlled component based on those commands, thereby allowing user to interact with selected controlled component using companion remote as if it was dedicated to that controlled component.

15 Claims, 1 Drawing Sheet

(51) Int. Cl.
| | | |
|---|---|---|
| *H04N 21/414* | (2011.01) | |
| *H04N 21/4227* | (2011.01) | |
| *H04N 21/81* | (2011.01) | |
| *G08C 17/02* | (2006.01) | |
| *G08C 23/04* | (2006.01) | |
| *G05B 15/02* | (2006.01) | |
| *H04L 12/28* | (2006.01) | |

(52) U.S. Cl.
CPC ......... *H04L 12/2816* (2013.01); *H04N 21/00* (2013.01); *H04N 21/41407* (2013.01); *H04N 21/4227* (2013.01); *H04N 21/8193* (2013.01); *H04N 2005/4425* (2013.01)

(58) Field of Classification Search
CPC ............ G08C 2201/91; G08C 2201/92; G08C 2201/93; H04N 5/4403; H04N 21/4126; H04N 21/4222; H04N 21/42204; H04N 21/42207; H04N 21/42208; H04N 21/42224; H04N 21/42225; H04N 21/43615; H04N 7/163; H04M 1/72533; H04M 2250/02; H04M 2250/04; H04M 2250/06; H04M 2250/22; H04L 12/2803; H04L 12/2816; H04L 2012/2841; H04L 2012/2849; H04L 2012/285; G05B 15/02; G05B 2219/2615
See application file for complete search history.

(56) References Cited

U.S. PATENT DOCUMENTS

| | | | | |
|---|---|---|---|---|
| 7,969,514 B2* | 6/2011 | Haughawout | .......... | G08C 19/28 340/426.13 |
| 8,150,387 B2* | 4/2012 | Klein | ................ | H04M 1/72533 348/734 |
| 8,432,490 B2* | 4/2013 | Lee | ...................... | H04N 5/4403 348/563 |
| 8,525,938 B2* | 9/2013 | Haughawout | .......... | G08C 19/28 340/426.13 |
| 8,659,400 B2* | 2/2014 | Arling | .................... | G08C 19/28 340/12.23 |
| 8,918,719 B2* | 12/2014 | Hilbrink | ................ | G06F 3/0484 715/740 |
| 8,997,002 B2* | 3/2015 | Hilbrink | ................ | G06F 3/0484 715/744 |
| 9,066,126 B2* | 6/2015 | Moroney | ......... | H04N 21/42207 |
| 9,288,534 B2* | 3/2016 | Sheridan | ................ | H04N 7/163 |
| 9,804,757 B2* | 10/2017 | Hilbrink | ................ | G06F 3/0484 |
| 9,851,879 B2* | 12/2017 | Hilbrink | ............ | G06F 3/04842 |
| 9,852,615 B2* | 12/2017 | Perez | .................... | G08C 17/02 |
| 2004/0215816 A1* | 10/2004 | Hayes | ................ | H04L 12/2803 709/238 |
| 2004/0236442 A1 | 11/2004 | Maymudes | | |
| 2006/0168618 A1 | 7/2006 | Choi | | |
| 2009/0094654 A1* | 4/2009 | Sullivan | ................ | H04N 7/163 725/110 |
| 2009/0156251 A1* | 6/2009 | Cannistraro | ........... | G08C 17/02 455/557 |
| 2010/0060569 A1* | 3/2010 | Shamilian | ............. | G06F 1/1626 345/156 |
| 2011/0085083 A1 | 4/2011 | Friedlander | | |
| 2011/0113353 A1* | 5/2011 | Koh | ...................... | G06F 3/0488 715/760 |
| 2011/0117850 A1* | 5/2011 | Fung | ...................... | G08C 17/02 455/41.3 |
| 2011/0260903 A1* | 10/2011 | Wong | ..................... | G08C 23/04 341/176 |
| 2011/0289113 A1* | 11/2011 | Arling | .................... | G08C 17/02 707/769 |
| 2011/0302201 A1* | 12/2011 | Ogaz | ...................... | G06Q 30/02 707/769 |
| 2011/0304443 A1* | 12/2011 | Sheridan | ................ | H04N 7/163 340/12.5 |
| 2012/0041925 A1* | 2/2012 | Pope | ...................... | G06F 3/0486 707/626 |
| 2012/0062468 A1* | 3/2012 | Chen | ...................... | G06F 9/4443 345/173 |
| 2012/0064820 A1* | 3/2012 | Bemmel | ............. | G08G 1/0141 455/3.02 |
| 2012/0086563 A1* | 4/2012 | Arling | ................... | G06F 3/0486 340/12.52 |
| 2012/0116559 A1* | 5/2012 | Davis | ...................... | G06F 3/002 700/94 |
| 2012/0119888 A1* | 5/2012 | Reeves | ............... | G05B 19/0426 340/12.24 |
| 2012/0140124 A1* | 6/2012 | Moroney | ......... | H04N 21/42207 348/734 |
| 2012/0151509 A1* | 6/2012 | McCarthy | ............. | H04H 20/38 725/9 |
| 2012/0210268 A1* | 8/2012 | Hilbrink | ................ | G06F 3/0484 715/773 |
| 2012/0225645 A1* | 9/2012 | Sivan | ...................... | G08C 17/02 455/418 |
| 2012/0242526 A1* | 9/2012 | Perez | ...................... | G08C 17/02 341/176 |
| 2012/0249890 A1* | 10/2012 | Chardon | .................. | H04N 5/44 348/734 |
| 2012/0277000 A1* | 11/2012 | Vange | ..................... | A63F 13/06 463/37 |
| 2012/0282914 A1* | 11/2012 | Alexander | ........ | H04M 1/72527 455/420 |
| 2013/0065695 A1* | 3/2013 | Berner | .................... | A63F 13/26 463/42 |
| 2013/0109371 A1* | 5/2013 | Brogan | .................. | G06F 1/1626 455/420 |
| 2014/0163751 A1* | 6/2014 | Davis | ...................... | H04L 12/12 700/286 |
| 2014/0376919 A1* | 12/2014 | Nykoluk | ................ | G08C 23/04 398/107 |

* cited by examiner

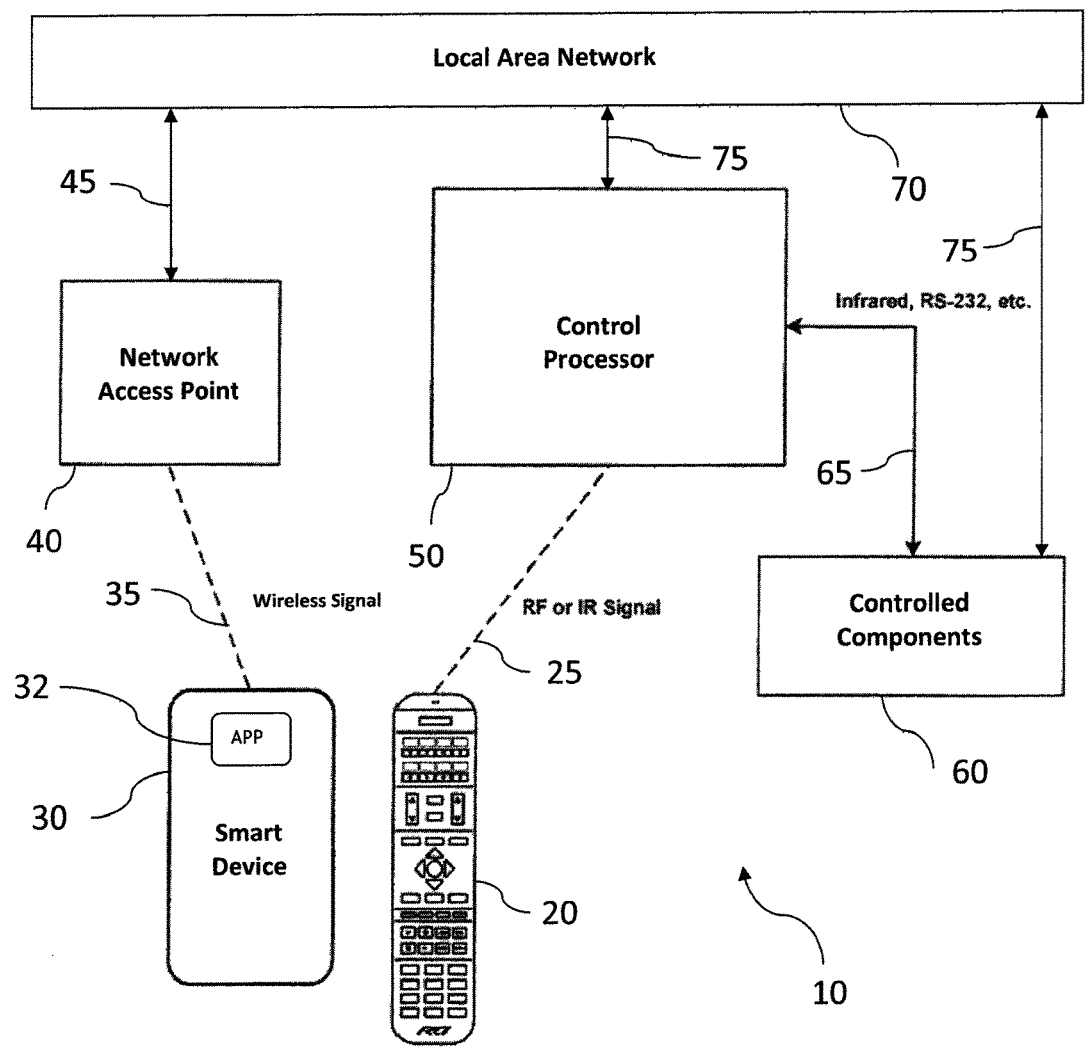

COMPANION CONTROL INTERFACE FOR SMART DEVICES

This application is a continuation of U.S. application Ser. No. 13/115,363, filed May 25, 2011, now U.S. Pat. No. 8,897,897.

FIELD OF THE INVENTION

The present invention is generally related to remote control devices for controlling various systems. More specifically, the present invention relates to remote control devices and controlling systems used in conjunction with smart devices (e.g. smart phones).

BACKGROUND OF THE INVENTION

General automation systems are becoming more and more prevalent in homes, office buildings, hotels, and other facilities. Typical present day automation systems have the capability to provide the coordinated control of heating and/or cooling systems, security systems, audiovisual systems, lighting systems, appliances, communication systems, etc. For example, it is not uncommon for residential structures to have audiovisual systems which provide music and/or programming to multiple locations throughout the structure. A coordinated heating/cooling system could also be included to allow programmed control of the building temperature. Similarly, office buildings often have the need for audiovisual systems in conference rooms which provide media management, and data communications capabilities. An audiovisual control system may also include a network computer, thus providing the additional ability to access networks and/or the Internet via audiovisual displays. In yet another example, hotels and multi-unit residential facilities may incorporate automated systems to provide communication between rooms and a centralized service system providing desired amenities (concierge services, room service, etc.) In this example, each residence may include an interface unit interacting with a main desk, thus easily allowing messages and information to be easily communicated as necessary. Further, entertainment programming could likewise be distributed utilizing this same system, with programming being provided to individual rooms by a central system and played via in-room equipment.

Remote controls are widely utilized in many of the above-mentioned control systems. Remote control devices are becoming more and more sophisticated, providing additional convenience, capabilities and features. For example, compact displays in remote control devices are becoming more efficient and effective, thus providing the ability to clearly display significant amounts of information in a relatively small area. Additionally, processing power continues to increase, thus providing the ability to include relatively complex processors within compact remote control devices. Other notable features of present day remote controls include the ability to cooperate with multiple different devices as desired. As can be anticipated, several options are available which allow for the development of extremely powerful remote control devices.

With increased power and capability comes the added complexity of programming and/or operating these remote control devices. The ability to clearly communicate information required for a user to program or operate a handheld remote must be balanced with the need to keep these devices an appropriate and ergonomically acceptable size. Even with the continuing development in compact displays, the available area for conveying complex and often confusing information to the user is limited.

In addition, modern day handheld devices have become increasingly powerful. Examples of these devices include smart phones, music players, electronic tablets, etc. More specifically, these devices include the iPhone™, iPod Touch™ and iPad™ devices (manufactured and sold by Apple Inc.), smart phones and tablets by Blackberry™, Android™ phones and tablets, and touch screen devices by Motorola, Samsung and others. These devices all include processors capable of performing multiple tasks and supporting many different "applications". One particular application allows these devices to control various devices using network connections such as WIFI or cellular networks. Using those communication techniques, these devices are able to transmit control signals to audio/visual equipment either directly via IP or using an additional hardware interface box. In essence, the user has the ability to utilize the interface of the handheld device to provide control signals to additional components.

When using this "remote control application" to control additional equipment, smart devices have a number of shortcomings. Most significantly, the handheld device must be running the actual remote control application to be effective. If a user switches to another application or uses the smart device in any other way, they must then "switch back" to the remote control application in order to produce and transmit control signals. For users who "multi-task", this can be very inconvenient, distracting and time consuming.

SUMMARY OF THE INVENTION

To effectively utilize the power of modern day smart devices, and to provide convenient operation of controlled equipment, the systems of the present invention coordinate the operation of an additional "basic" remote control in conjunction with the smart device. In one exemplary use, the smart device is initially used to configure the controlled components and to issue initial control signals. The system will recognize the desired actions/settings, and configure the "basic" or companion remote to operate in parallel. In this configuration, the user will have instant access to typical controls (e.g. play, stop, pause, vol. +, vol. −, etc.) while also allowing for alternative use of the smart device.

BRIEF DESCRIPTION OF THE DRAWINGS

Further objects and advantages of the present invention can be seen from reading the following detailed description of the preferred embodiments, in conjunction with the drawings in which:

FIG. 1 is an exemplary schematic diagram illustrating various components of an overall companion remote control system utilizing a smart device.

DETAILED DESCRIPTION OF PREFERRED EMBODIMENTS

Described below is an exemplary embodiment of the present invention along with a discussion of various features and capabilities. In this exemplary system, various components are shown for purposes of illustrating the overall operation of the present invention. It is understood, however, that modifications, substitutions and changes in actual components may be made without departing from the scope and spirit of the invention.

Referring to FIG. 1, a central component of control system setup 10 is a control processor 50, which includes multiple input and output ports, thus providing for flexible communication capabilities with various components. It is to be understood that control processor 50 may take many forms including a stand-alone device or a portion of a larger device or system. In communication with control processor 50 are a hand-held companion remote 20, a local area network 70 and one or more controlled components 60. As examples, controlled components may include items such as televisions, DVD players/recorders, CD players/recorders, tuners, other audiovisual entertainment devices, thermostats and other controllable environmental devices. As suggested above, control processor 50 includes a microprocessor or microcontroller capable of coordinating operation of the entire control system setup 10.

Control system setup 10 also includes a smart device 30 capable of communicating with the local area network 70 through a wireless network access point 40. It will be understood that this communication with the network could also be achieved using alternative communication methods, such as Bluetooth, Zigbee, cellular networks (e.g. 3G), etc. The smart device 30 includes any programmable "smart" device, preferably having a touch screen graphical interface. Again, these may include smart phones (i.e., Android™, iPhone™, Blackberry™, etc.), tablets, laptops or other personal computers. One or more of these types of devices are readily available in many homes in the United States, making them a low cost option for interfacing with the control processor 50.

Unfortunately, these types of smart devices 30 have poor ergonomics for control tasks that require frequent interaction with the interface (e.g. volume adjustment, channel changing, stop, play, etc.) In addition, the smart device 30 may not be readily available at every moment when someone desires to interface with the control processor 50. This is often due to the smart device 30 being powered down, being used by another person or being used for another task, such as talking on the phone.

The companion remote 20 resolves these issues when used in conjunction with a smart device 30. A software application 32, commonly referred to as an "app," is designed to run on a general purpose smart device 30. Variations in the app 32 are available to conform the app 32 to the requirements of the different smart device platforms. Among other functions, the app 32 communicates with the control processor 50 via a wireless signal 35 to a network access point 40, which has a connection 45 to the local area network 70. Also in communication with the network 70 is a control processor 50 (connected via connection 75.) Typically, this network is configured as a home WIFI network using well known wireless equipment. Again, many different connection techniques could be used, such as those using cellular signals, bluetooth signals, etc. It is also possible for smart device 30 to be hardwire connected to local area network 70 via appropriate cables (not shown). The app 32 provides easy, user-friendly graphic interface screens for users to indicate their choice of controlled components 60, and to view status feedback, metadata, etc. from controlled components 60.

Companion remote 20 is not programmable in the same manner, and does not need to be configured by the user. It does, however, require a unique identification number embedded in the hardware or internal software. In addition, companion remote 20 includes a number of well understood and common control buttons, and includes appropriate communication programming to transmit the users desired actions to control processor 50. Activation of the various buttons on companion remote 20 results in a unique identifiable signal to be transmitted which is recognized by control processor 50. Companion remote 20 communicates with control processor 50 via any appropriate communication method 25, including but not limited to one-way RF, bi-directional RF, infrared, hardwired, etc. Control processor 50 stores all of the command data and thus communicates the needed commands to the controlled components 60 through any suitable communication methods 65, such as infrared, RS-232, etc. Control processor 50 keeps track of selected controlled component(s) 60 and generally coordinates the transmission of appropriate signals to all related devices. Using stored programming, control processor 50 also correlates the button presses on the companion remote 20 with the commands for the currently selected controlled component 60.

All of the configurations and choices concerning the available controlled components 60 are handled with the easy-to-use graphic interface on the smart device 30. Using stored app 32, smart device 30 continues to provide the ability to control any of the controlled components 60. In use, control processor 50 will help to coordinate signals coming from smart device 30 in order to provide the control functions desired, and to provide overall coordination for control system setup 10. In addition, control processor 50 interprets the command choices received from companion remote 20 as if companion remote 20 was dedicated only to that particular selected controlled component 60. Control processor 50 then sends the appropriate instructions to controlled component 60 based on the received commands from companion remote 20. However, when the user makes another choice of controlled component 60, companion remote 20 becomes a dedicated command device for the newly selected controlled component 60 through the interpretation by control processor 50.

The present invention provides a unique solution having all the elements of a robust, high-end control system. It provides a rich graphical interface, user friendly ergonomics and highly reliable operation in a seamless, low cost package. The three primary components of the invention, companion remote 30, programmable control processor 50 and the software application are versatile and easily adjusted to fit a user's needs. Using the coordinated companion remote also reduces, if not eliminates, the frustration of today's complex and confusing universal remote controls.

Those skilled in the art will further appreciate that the present invention may be embodied in other specific forms without departing from the spirit or central attributes thereof. In that the foregoing description of the present invention discloses only exemplary embodiments thereof, it is to be understood that other variations are contemplated as being within the scope of the present invention. Accordingly, the present invention is not limited in the particular embodiments which have been described in detail therein. Rather, reference should be made to the appended claims as indicative of the scope and content of the present invention.

What is claimed is:

1. A control processor for communicating with a companion remote control unit and a smart device, and for further coordinating the control of a plurality of controlled components, the control processor comprising:

a companion remote interface configured to receive command signals from the companion remote control unit, wherein the received signals are indicative of user commands selected by a user of the companion remote control unit to cause a selected action to be taken by the controlled component;

a smart device interface configured to receive control signals from the smart device, wherein the smart device is running a software application to provide a graphical interface allowing the user to designate a selected controlled component from the plurality of controlled components, and the signal received by the control processor from the smart device is indicative of the user designation; and a microcontroller programmed to correlate the command signals received at the companion remote interface wherein the smart device interface and the companion remote interface are configured to receive control signals and command signals, respectively, both simultaneously and asynchronously, and the control signals received at the smart device interface and to subsequently produce appropriate instructions for the selected controlled component, as indicated by signals received from the smart device interface, which will cause the selected controlled component to carry out the selected action, as indicated by the command signals received at the companion remote interface, thereby allowing the user to interact with the selected controlled component using the companion remote as if the companion remote was dedicated to the selected controlled component.

2. The control processor of claim 1 wherein the microcontroller is further programmed to re-correlate the user commands received from the companion remote to appropriate instructions for a different controlled component upon receipt of a signal from the smart device indicative of a desire to change the controlled component.

3. The control processor of claim 2 wherein the smart device interface is a local area network connection.

4. The control processor of claim 1 wherein the microcontroller is capable of identifying signals received from the companion remote based upon a unique identification number.

5. A method of controlling a plurality of controlled components using a control processor in communication with a companion remote control and a smart device, the method comprising:

the control processor receiving a control signal from the smart device at a smart device input designating one of the controlled components as a selected controlled component;

the control processor further receiving command signals at a companion remote input of the control processor from the companion remote control indicative of desired commands selected by a user to cause some action to be carried out by a selected controlled component;

correlating the command signals received at the companion remote input and the control signals received at the smart device input to thus produce appropriate signals necessary for the selected controlled component to carry out the desired commands, wherein the command signals and the control signals can be received both simultaneously and asynchronously, and transmitting the appropriate signals via an output to the selected controlled component, thereby allowing the user to interact with the selected controlled component using the companion remote as if the companion remote was dedicated to the selected controlled component.

6. The method of claim 5 further comprising receiving subsequent signals from the smart device designating a newly selected controlled component, and subsequently re-correlating user commands received from the companion remote to appropriate instructions for the newly selected controlled component, thereby causing signals received from the companion remote to cause appropriate actions to be taken by the newly selected controlled component.

7. The method of claim 5 wherein the control processor receives the selections of controlled components from the smart device via a local area network.

8. A control processor for use in an automated control system having a plurality of controlled components, the control processor comprising:

a smart device interface configured to receive control signals from a smart device, wherein the smart device is programmed to provide a user interface which allows a user to select a particular controlled component and, in response to the user selection, the smart device is programmed to transmit a control signal indicative of the selected control component to the smart device interface;

a companion remote interface configured to receive command signals from a companion remote control, the companion remote control having a plurality of user selectable commands and related systems to produce and transmit a command signal indicative of a user selected command to the companion remote interface; and a microcontroller configured to interact with the smart device interface and the companion remote interface, wherein the control signals received at the smart device interface will cause the microcontroller to keep track of the selected controlled component so that the command signals received from the companion remote will cause the microcontroller to subsequently produce related component command signals, wherein the smart device interface and the companion remote interface are configured to receive control signals and command signals, respectively, both simultaneously and asynchronously, wherein the related component command signals are communicated to the selected controlled component, and wherein the related component command signals will cause the selected controlled component to carry out the user selected command.

9. The control processor of claim 8, wherein the companion remote is not related to any controlled component.

10. The control processor of claim 8, wherein the related command signals produced by the microcontroller are communicated to the selected controlled component via a wireless signal.

11. The control processor of claim 8, wherein the related command signals produced by the microcontroller are communicated to the selected controlled components via a network.

12. The control processor of claim 8 wherein the companion remote interface is a wireless signal receiver and wherein the control processor and companion remote communicate via wireless signals.

13. The control processor of claim 8 wherein the related command signals produced by the microcontroller are communicated to the controlled component via a direct connection.

14. The control processor of claim 8 wherein the related command signals produced by the microcontroller are communicated to the controlled component via a wireless connection.

15. The control processor of claim 8 wherein the user interface of the smart device further allows a user to select a desired user command, and the microcontroller will produce the related command signal in response to a user command from either the smart device or the companion remote.

* * * * *